US012503020B2

(12) United States Patent
Lin et al.

(10) Patent No.: US 12,503,020 B2
(45) Date of Patent: Dec. 23, 2025

(54) ANTI-SUBMARINING BELT FOR A SEAT IN A VEHICLE

(71) Applicant: GM Global Technology Operations LLC, Detroit, MI (US)

(72) Inventors: Chin-Hsu Lin, Troy, MI (US); Ashish Nayak, Bhopal (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 18/502,630

(22) Filed: Nov. 6, 2023

(65) Prior Publication Data

US 2025/0145066 A1 May 8, 2025

(51) Int. Cl.
*B60N 2/427* (2006.01)

(52) U.S. Cl.
CPC .............................. *B60N 2/42763* (2013.01)

(58) Field of Classification Search
CPC .................................................. B60N 2/42763
See application file for complete search history.

(56) References Cited

U.S. PATENT DOCUMENTS

| | | | | |
|---|---|---|---|---|
| 4,155,592 A * | 5/1979 | Tsuda | ........... | B60N 2/6673 297/284.4 |
| 5,058,952 A * | 10/1991 | LaSota | ........... | A47C 7/28 297/452.23 |
| 6,616,229 B2 * | 9/2003 | Kuster | ........... | B60N 2/99 297/284.3 |
| 6,793,289 B2 * | 9/2004 | Kuster | ........... | B60N 2/72 297/452.52 |
| 6,863,298 B2 * | 3/2005 | Sakai | ........... | B60R 22/1952 280/728.1 |
| 8,172,267 B2 * | 5/2012 | Eberle | ........... | B60R 22/46 280/806 |
| 9,199,560 B2 * | 12/2015 | Line | ........... | B60N 2/42781 |
| 9,340,130 B2 * | 5/2016 | Tanaka | ........... | B60N 2/42718 |
| 10,308,205 B2 * | 6/2019 | Schneider | ........... | B60R 21/2338 |
| 10,583,755 B2 * | 3/2020 | Frye | ........... | B60N 2/2227 |
| 10,821,863 B1 * | 11/2020 | Nageshkar | ........... | B60N 2/58 |
| 11,518,278 B2 * | 12/2022 | Dry | ........... | B60N 2/143 |
| 2017/0057386 A1 * | 3/2017 | Kanto | ........... | B60R 21/207 |

FOREIGN PATENT DOCUMENTS

| DE | 102014217680 A1 | 3/2015 | |
|---|---|---|---|
| DE | 102016012084 A1 * | 10/2017 | ........ B60N 2/42763 |
| DE | 102017213591 A1 * | 2/2019 | ........ B60N 2/686 |

* cited by examiner

*Primary Examiner* — Timothy J Brindley
(74) *Attorney, Agent, or Firm* — Vivacqua Crane, PLLC

(57) ABSTRACT

A seat for a vehicle includes a frame defining opposing side members and an anti-submarining belt. The anti-submarining belt defines a first end portion, a second end portion, a stowed position, and a deployed position. The first end portion of the anti-submarining belt is fixedly attached to one of the opposing side members of the frame. The anti-submarining belt includes slack when in the stowed position and is pulled taut into the deployed position. The seat includes a seat cushion defining a compressed state and an uncompressed state. The seat cushion rests against anti-submarining belt and is in the uncompressed state when the anti-submarining belt is in the stowed position and is compressed into the compressed state by the anti-submarining belt as the anti-submarining belt is pulled taut into the deployed position. The seat includes a pretensioner connected to the second end portion of the anti-submarining belt.

16 Claims, 3 Drawing Sheets

ANTI-SUBMARINING BELT FOR A SEAT IN A VEHICLE

INTRODUCTION

The present disclosure relates to an anti-submarining belt for a seat in a vehicle. The anti-submarining belt is pulled taut from a stowed position into a deployed position by a pretensioner to compress a seat cushion.

Some autonomous vehicles include seats that have various features or characteristics that are not typically found in vehicles that are manually operated by a driver. For example, the seats in an autonomous vehicle may be able to recline at higher angles when compared to vehicles manually operated by drivers. However, if the seat is in a reclined position during a sudden deceleration experienced during a vehicle impact event, then a lower part of an occupant's body may be pushed deep into the seat cushion and slip beneath the occupant's lap belt, which is referred to as submarining. The relatively high recline angles, which are often found in seats of an autonomous vehicle, may increase the tendency of an occupant to submarine when the vehicle undergoes a sudden deceleration.

Thus, while current seats achieve their intended purpose, there is a need in the art for an improved approach to reduce the instances when an occupant may submarine within a seat.

SUMMARY

According to several aspects, a seat for a vehicle is disclosed, and includes a frame defining opposing side members that each correspond to either a left-hand side or a right-hand side of the seat. The east includes an anti-submarining belt defining a first end portion, a second end portion, a stowed position, and a deployed position, where the first end portion of the anti-submarining belt is fixedly attached to one of the opposing side members the frame, and wherein the anti-submarining belt includes slack when in the stowed position and is pulled taut into the deployed position. The seat also includes a seat cushion defining a compressed state and an uncompressed state, where the seat cushion rests against anti-submarining belt and is in the uncompressed state when the anti-submarining belt is in the stowed position and is compressed into the compressed state by the anti-submarining belt as the anti-submarining belt is pulled taut into the deployed position. The seat also includes a pretensioner connected to the second end portion of the anti-submarining belt, where the anti-submarining belt is pulled taut from the stowed position into the deployed position when the pretensioner is deployed.

In another aspect, the anti-submarining belt is urged in an upward direction and applies pressure upon a bottom surface of the seat cushion when pulled taut into the deployed position.

In yet another aspect, the pretensioner is disposed on a remaining side member of the frame.

In an aspect, the seat includes one or more controllers in electronic communication with the pretensioner.

In another aspect, the one or more controllers execute instructions to determine the vehicle is about to undergo a collision and in response to determining the vehicle is about to undergo a collision, send a firing signal to the pretensioner instructing the pretensioner to deploy.

In yet another aspect, the pretensioner includes more than one level of deployment and the firing signal indicates a level of deployment of the pretensioner.

In an aspect, increasing the level of deployment of the pretensioner results in increasing a level of tension the anti-submarining belt undergoes in the deployed position.

In another aspect, the one or more controllers determine a level of deployment of the pretensioner based on at least one of the following: an impact severity, a weight of an occupant, and a predetermined stiffness of a body of the seat cushion.

In yet another aspect, the one or more controllers execute instructions to select either a first stage deployment or a second stage deployment of the pretensioner.

In an aspect, the second stage deployment of the pretensioner in a greater level of compression in the body of the seat cushion when compared to the first stage deployment of the pretensioner.

In another aspect, the one or more controllers execute instructions to select the first stage deployment of the pretensioner when a vehicle speed is greater than a first stage deployment speed and less than a second stage deployment speed, where the second stage deployment speed is greater than the first stage deployment speed.

In yet another aspect, the one or more controllers execute instructions to select the second stage deployment of the pretensioner when the vehicle speed is greater than the second stage deployment speed.

In an aspect, the anti-submarining belt is constructed of seat belt webbing.

In another aspect, a seat for a vehicle, wherein the seat includes a frame defining opposing side members that each correspond to either a left-hand side or a right-hand side of the seat. The sea also includes an anti-submarining belt defining a first end portion, a second end portion, a stowed position, and a deployed position, where the first end portion of the anti-submarining belt is fixedly attached to one of the opposing side members the frame, and wherein the anti-submarining belt includes slack when in the stowed position and is pulled taut into the deployed position. The seat further includes a seat cushion defining a compressed state and an uncompressed state, where the seat cushion rests against anti-submarining belt and is in the uncompressed state when the anti-submarining belt is in the stowed position and is compressed into the compressed state by the anti-submarining belt as the anti-submarining belt is pulled taut into the deployed position. The seat includes a pretensioner connected to the second end portion of the anti-submarining belt, where the anti-submarining belt is pulled taut from the stowed position into the deployed position when the pretensioner is deployed. The seat includes one or more controllers in electronic communication with the pretensioner, where the one or more controllers execute instructions to determine the vehicle is about to undergo a collision and in response to determining the vehicle is about to undergo a collision, send a firing signal to the pretensioner instructing the pretensioner to deploy.

In another aspect, the pretensioner includes more than one level of deployment and the firing signal indicates a level of deployment of the pretensioner.

In yet another aspect, increasing the level of deployment of the pretensioner results in increasing a level of tension the anti-submarining belt undergoes in the deployed position.

In an aspect, the one or more controllers determine a level of deployment of the pretensioner based on at least one of the following: an impact severity, a weight of an occupant, and a predetermined stiffness of a body of the seat cushion.

In another aspect, the one or more controllers execute instructions to select either a first stage deployment or a second stage deployment of the pretensioner.

In yet another aspect, the one or more controllers execute instructions to select the first stage deployment of the pretensioner when a vehicle speed is greater than a first stage deployment speed and less than a second stage deployment speed, where the second stage deployment speed is greater than the first stage deployment speed.

In an aspect, a seat for a vehicle is disclosed. The seat includes a frame defining opposing side members that each correspond to either a left-hand side or a right-hand side of the seat. The seat includes an anti-submarining belt defining a first end portion, a second end portion, a stowed position, and a deployed position, where the first end portion of the anti-submarining belt is fixedly attached to one of the opposing side members the frame, and wherein the anti-submarining belt includes slack when in the stowed position and is pulled taut into the deployed position. The seat includes a seat cushion defining a compressed state and an uncompressed state, wherein the seat cushion rests against anti-submarining belt and is in the uncompressed state when the anti-submarining belt is in the stowed position and is compressed into the compressed state by the anti-submarining belt as the anti-submarining belt is pulled taut into the deployed position. The seat includes a pretensioner connected to the second end portion of the anti-submarining belt, wherein the anti-submarining belt is pulled taut from the stowed position into the deployed position when the pretensioner is deployed, and where the pretensioner includes more than one level of deployment. The seat also includes one or more controllers in electronic communication with the pretensioner, where the one or more controllers execute instructions to determine the vehicle is about to undergo a collision and in response to determining the vehicle is about to undergo a collision, send a firing signal to the pretensioner instructing the pretensioner to deploy, where the firing signal indicates a level of deployment of the pretensioner.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
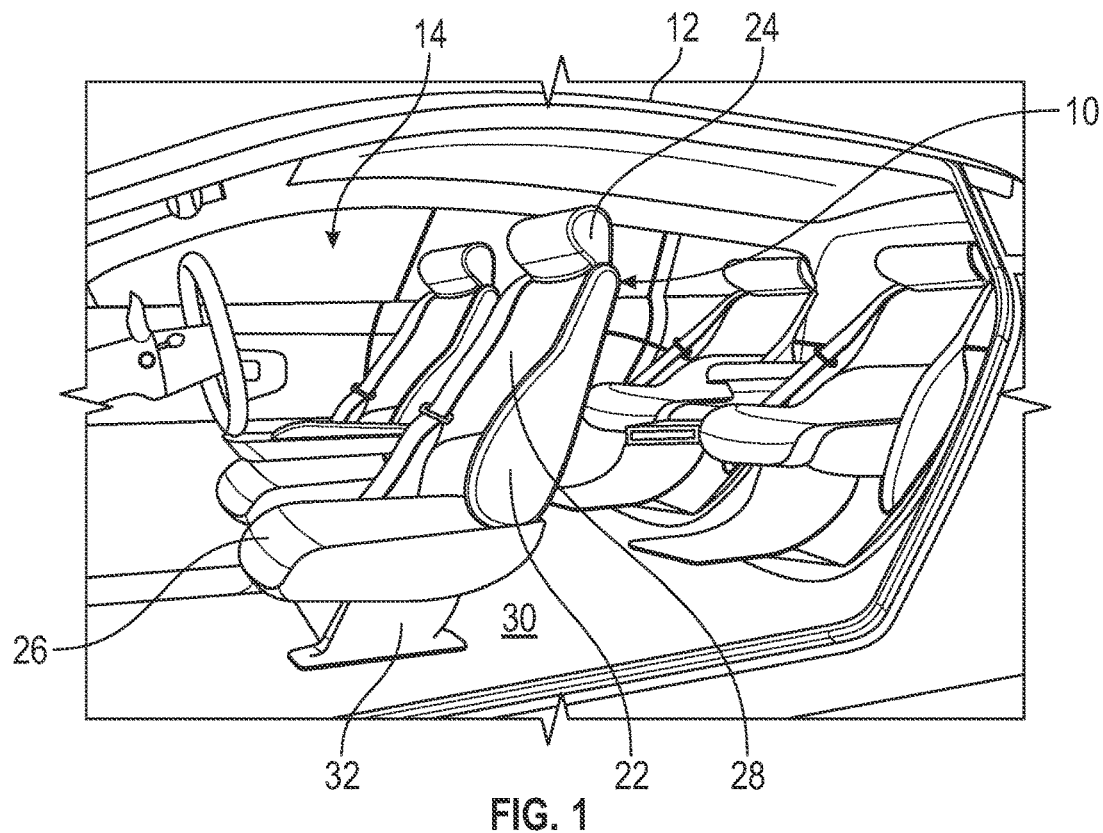
FIG. 1 is a perspective view of an interior cabin of a vehicle including a seat, according to an exemplary embodiment.

Referring to FIG. 1, an exemplary seat 10 disposed within an interior cabin 14 of a vehicle 12 is illustrated. In one non-limiting embodiment, the vehicle 12 is an autonomous vehicle. However, it is to be appreciated that the disclosure is not limited to autonomous vehicles, and the seat 10 may be employed in vehicles that are manually operated as well. The vehicle 12 may be any type of vehicle such as, but not limited to, a sedan, truck, sport utility vehicle, van, or motor home. In another embodiment, the vehicle 12 may be an aircraft or a marine vehicle.

The seat 10 includes a seat pan 16 (shown in FIG. 2), a frame 18 (shown in FIG. 2), an anti-submarining belt 20 (shown in FIG. 2), a seat back 22, a headrest 24, a seat cushion 26, and a back cushion 28. The frame 18 of the seat 10 is operatively connected to a floor 30 of the interior cabin 14 of the vehicle 12 by a support structure 32. In the example as shown in FIG. 1, the support structure 32 allows for the seat 10 to rotate relative to the floor 30 of the vehicle 12, however, it is to be appreciated that FIG. 1 is merely exemplary in nature and the seat 10 may be non-rotatable as well. For example, in another embodiment, the support structure 32 may be a pair of seat tracks instead.

Figure 2:
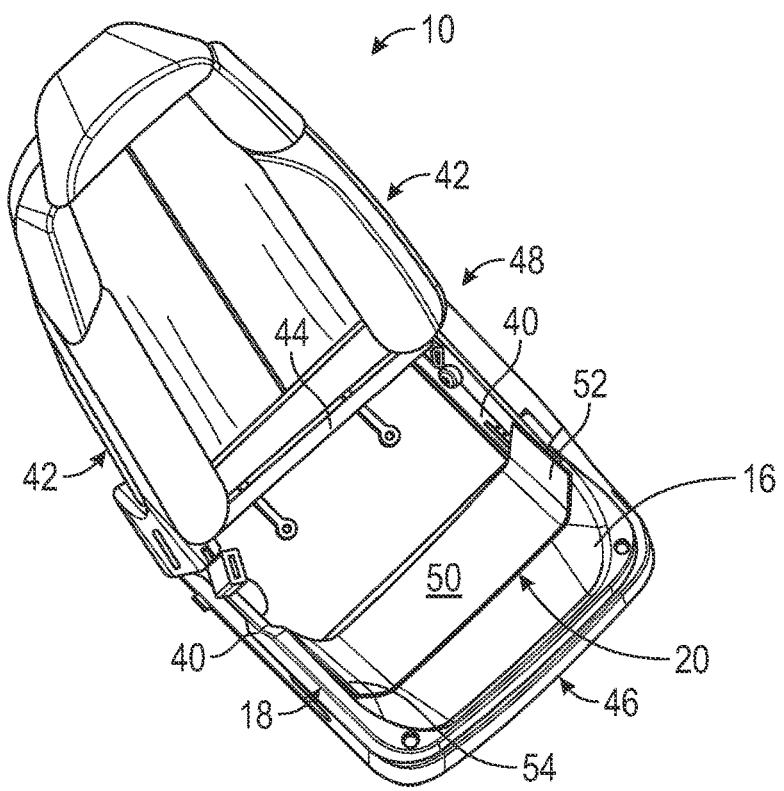
FIG. 2 is an elevated view of the seat in FIG. 1 where a seat cushion has been removed to reveal the disclosed anti-submarining belt, according to an exemplary embodiment.
Figure 3:
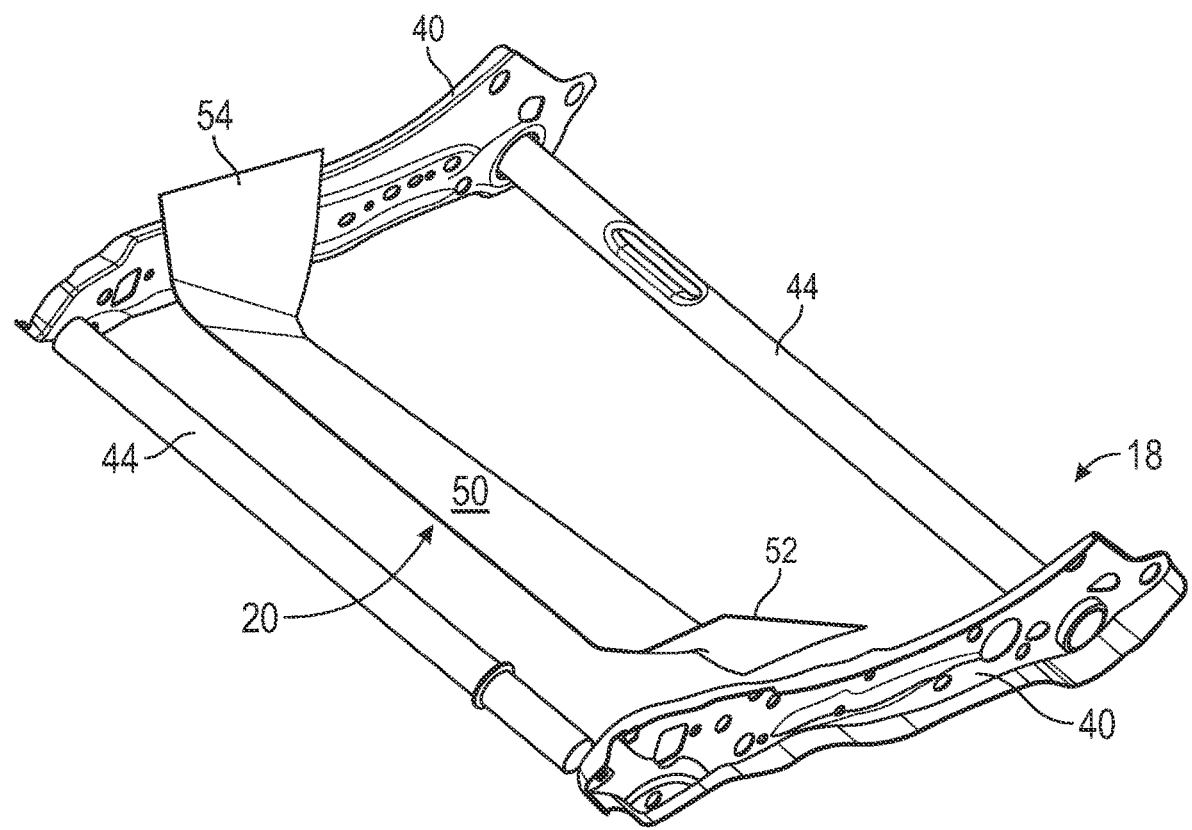
FIG. 3 is a perspective view of the side frame, where a seat pan is removed and the anti-submarining belt has been separated from the side frame, according to an exemplary embodiment.

FIG. 2 is an elevated view of the seat 10, where the seat cushion 26 is removed to reveal the seat pan 16, the frame 18 and the anti-submarining belt 20. FIG. 3 is a perspective view of the frame 18, where the anti-submarining belt 20 has been separated from the frame 18. Referring to both FIGS. 2 and 3, the frame 18 defines opposing side members 40 that correspond to the left-hand side and the right-hand sides 42 of the seat 10. The frame 18 also includes two connecting members 44 that connect the opposing side members 40 to one another, where one of the connecting members 44 corresponds to a front side 46 of the seat 10 and the remaining connecting member 44 corresponds to a rear side 48 of the seat 10.

Figure 4:
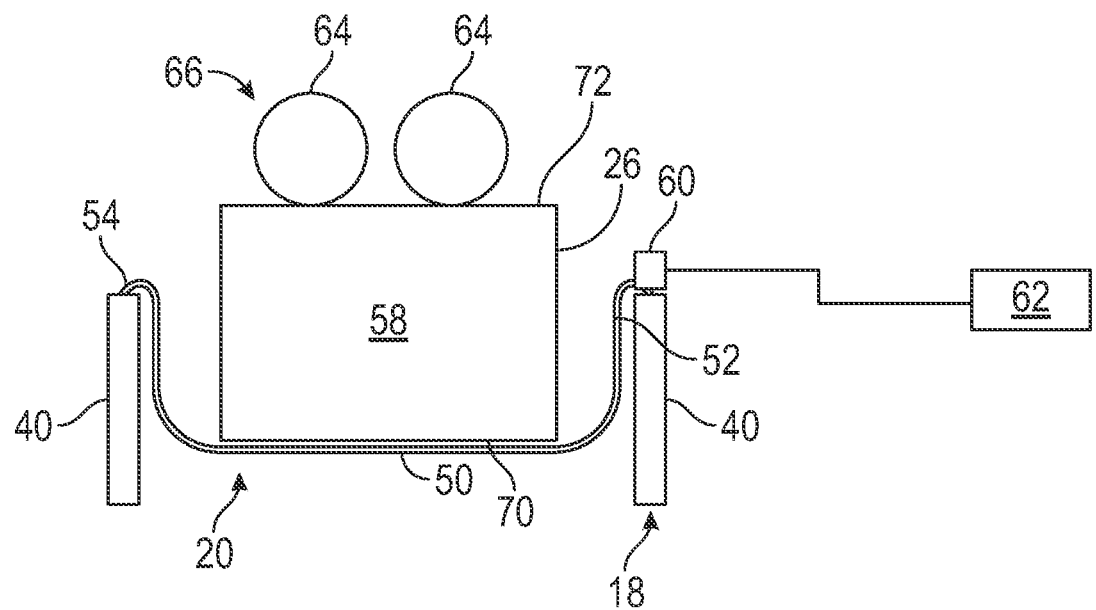
FIG. 4 is a schematic diagram of the seat cushion, an occupant seated upon the seat cushion, and the anti-submarining belt, where the anti-submarining belt is in a stowed position, according to an exemplary embodiment.
Figure 5:
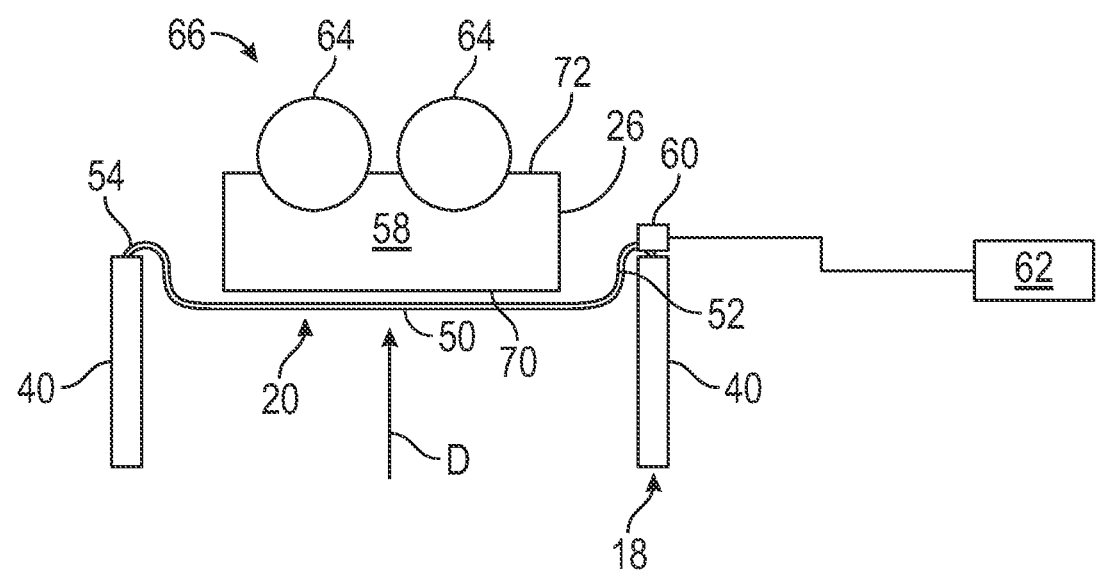
FIG. 5 is a schematic diagram of the seat cushion, the occupant, and the anti-submarining belt, where the anti-submarining belt is in a deployed position and the seat cushion is compressed, according to an exemplary embodiment.

The anti-submarining belt 20 includes a member 50 that is constructed of a relatively flexible material such as, but not limited to, a woven material such as seat belt webbing. The member 50 of the anti-submarining belt 20 defines a first end portion 52 and a second end portion 54. FIGS. 4 and 5 are schematic diagrams of the frame 18, the anti-submarining belt 20, the seat cushion 26, a pretensioner 60, one or more controllers 62 in electronic communication with the pretensioner 60, and the femur 64 of an occupant 66. The occupant 66 is seated upon an upper surface 72 of the seat cushion 26 of the seat 10 (FIGS. 1 and 2).

Referring to FIGS. 4 and 5, a first end portion 52 of the member 50 of the anti-submarining belt 20 is fixedly attached to one of the opposing side members 40 the frame 18, and the second end portion of the elongated member 50 is connected to the pretensioner 60. The pretensioner 60 is disposed on the remaining side member 40 of the frame 18. The seat cushion 26 defines a lower surface 70 and an upper surface 72, where the lower surface 70 of the seat cushion 26 faces the seat pan 16 (FIG. 1) and the occupant 66 is seated upon the upper surface 72 of the seat cushion 26.

The member 50 of the anti-submarining belt 20 extends in a transverse direction of the seat cushion 26 between the opposing side members 40 of the frame 18 of the seat 10 (FIG. 1). FIG. 4 illustrates the elongated member 50 in a stowed position and the seat cushion 26 in an uncompressed state. When the anti-submarining belt is in the stowed position, the anti-submarining belt 20 includes slack. As seen in FIG. 4, the lower surface 70 of the seat cushion 26 rests against anti-submarining belt 20. The seat cushion 26 is in the uncompressed state when the anti-submarining belt 20 is in the stowed position.

When the pretensioner 60 receives a firing signal from the one or more controllers 62, the pretensioner 60 is deployed and pulls the anti-submarining belt 20 taut into a deployed position, which is shown in FIG. 5. As seen in FIG. 5, the seat cushion 26 is compressed to the compressed state by the anti-submarining belt 20 as the anti-submarining belt 20 is pulled taut into the deployed position. Referring to both FIGS. 4 and 5, it is to be appreciated that during normal operation of the vehicle 12 (FIG. 1), the anti-submarining belt 20 is in the stowed position and the seat cushion 26 is in the uncompressed state. When the anti-submarining belt 20 is pulled taut into the deployed position, the member 50 is urged in an upward direction D to apply pressure upon the lower surface 70 of the seat cushion 26 and the seat cushion 26 is compressed into the compressed state.

Continuing to refer to both FIGS. 4 and 5, it is to be appreciated that the one or more controllers 62 receive acceleration signals from one or more satellite sensors (not shown) of the vehicle 12 (FIG. 1) and/or from another controller that is part of the vehicle 12, such as an airbag controller. The one or more controllers 62 determine that the vehicle 12 is undergoing a collision or other traffic incident that causes the vehicle 12 to make a sudden stop based on the acceleration signals. In response to determining the vehicle 12 is about to undergo a collision, the one or more controllers 62 send the firing signal to the pretensioner 60. The pretensioner 60 is deployed and retracts the member 50 of the anti-submarining belt 20 into the taut position in response to receiving the firing signal from the one or more controllers 62.

The seat cushion 26 includes a body 58 constructed of one or more materials having a predetermined stiffness such as, for example, polyurethane foam. The body 58 of the seat cushion 26 is compressed in the upwards direction D towards the occupant 66 when the seat cushion 26 is in the compressed state. It is to be appreciated that compressing the seat cushion 26 increases an overall stiffness of the body of the seat cushion 26, thereby controlling forward and downward excursion of the occupant 66 as the vehicle 12 undergoes a sudden stop, such as during a collision. Controlling the forward and downward excursion of the occupant 66 controls pelvic rotation of the occupant and may reduce or prevent instances of occupant submarining during a collision.

In one embodiment, the pretensioner 60 includes more than one level of deployment and the firing signal indicates a level of deployment of the pretensioner 60. Increasing the level of deployment of the pretensioner 60 results in increasing a level of tension the anti-submarining belt 20. In other words, increasing the level of deployment of the pretensioner 60 results in pulling the anti-submarining belt 20 more taut into the deployed position. It is to be appreciated that increasing the level of tension the anti-submarining belt 20 undergoes in the deployed position results in increasing a level of compression in the body 58 of the seat cushion 26. The level of deployment of the pretensioner 60 is determined based on at least one of an impact severity, the weight of the occupant 66, and the predetermined stiffness of the body 58 of the seat cushion 26. The one or more controllers 62 determine the impact severity based on the acceleration signals from the one or more satellite sensors (not shown) and/or from another controller that is part of the vehicle 12.

In one embodiment, the one or more controllers 62 select either a first stage deployment or a second stage deployment of the pretensioner 60. The anti-submarining belt 20 undergoes less tension when the pretensioner is in the first stage of deployment compared to the tension experienced in the second stage deployment. Accordingly, the second stage deployment of the pretensioner 60 results in a greater level of compression in the body 58 of the seat cushion 26 when compared to first stage deployment. In one exemplary embodiment, the one or more controllers 62 select the first stage deployment of the pretensioner 60 when the vehicle speed is greater than a first stage deployment speed and less than a second stage deployment speed, where the second stage deployment speed is greater than the first stage deployment speed. The one or more controllers 62 select the second stage deployment of the pretensioner 60 when the speed of the vehicle 12 is greater than the second stage deployment speed. In embodiments, the first stage deployment speed is about 20 kilometers per hour (kph) and the second stage deployment speed is about 40 kph, however, it is to be appreciated that these values are merely exemplary in nature.

It is to be appreciated that the one or more controllers 62 increase the level of deployment of the pretensioner 60 as the weight of the occupant 66 increases. Thus, heavier occupants result in a greater compression of the body 58 of the seat cushion 26. In one non-limiting example, if the occupant 66 is a fiftieth percentile male, then the body 58 of the seat cushion 26 is compressed no more than about twenty millimeters when in the compressed state. Furthermore, it is also to be appreciated that the one or more controllers 62 may decrease the level of deployment of the pretensioner 60 as the predetermined stiffness of the body 58 of the seat cushion 26 increases.

Referring generally to the figures, the disclosed anti-submarining belt provides various technical effects and benefits. Specifically, when the disclosed anti-submarining belt is pulled taut into the deployed position as the vehicle undergoes a sudden stop, the seat cushion of the seat is compressed, thereby increasing the overall stiffness of the body of the seat cushion. Compressing the seat cushion controls the forward and downward excursion of the occupant as the vehicle undergoes a sudden stop. Controlling the forward and downward excursion of the occupant controls pelvic rotation of the occupant and may reduce or prevent instances of occupant submarining during a collision.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat for a vehicle, wherein the seat comprises:
   a frame defining opposing side members that each correspond to either a left-hand side or a right-hand side of the seat;
   an anti-submarining belt defining a first end portion, a second end portion, a stowed position, and a deployed position, wherein the first end portion of the anti-submarining belt is fixedly attached to one of the opposing side members the frame, and wherein the anti-submarining belt includes slack when in the stowed position and is pulled taut into the deployed position;
   a seat cushion defining a compressed state and an uncompressed state, wherein the seat cushion rests against anti-submarining belt and is in the uncompressed state when the anti-submarining belt is in the stowed position and is compressed into the compressed state by the anti-submarining belt as the anti-submarining belt is pulled taut into the deployed position;
   a pretensioner connected to the second end portion of the anti-submarining belt, wherein the anti-submarining belt is pulled taut from the stowed position into the deployed position when the pretensioner is deployed, and wherein the pretensioner includes more than one level of deployment; and
   one or more controllers in electronic communication with the pretensioner, wherein the one or more controllers execute instructions to:
      determine the vehicle is about to undergo a collision;
      in response to determining the vehicle is about to undergo a collision, determine a level of deployment of the pretensioner based on a weight of an occupant and a predetermined stiffness of a body of the seat cushion, wherein the deployment compresses the body of the seat cushion no more than twenty millimeters in the compressed state when the occupant is a fiftieth percentile male; and
      send a firing signal to the pretensioner instructing the pretensioner to deploy, wherein the firing signal indicates the level of deployment of the pretensioner.

2. The seat of claim 1, wherein the anti-submarining belt is urged in an upward direction and applies pressure upon a bottom surface of the seat cushion when pulled taut into the deployed position.

3. The seat of claim 1, wherein the pretensioner is disposed on a remaining side member of the frame.

4. The seat of claim 1, wherein increasing the level of deployment of the pretensioner results in increasing a level of tension the anti-submarining belt undergoes in the deployed position.

5. The seat of claim 1, wherein the one or more controllers determine a level of deployment of the pretensioner further based on an impact severity.

6. The seat of claim 5, wherein the one or more controllers execute instructions to:
   select either a first stage deployment or a second stage deployment of the pretensioner.

7. The seat of claim 6, wherein the second stage deployment of the pretensioner in a greater level of compression in the body of the seat cushion when compared to the first stage deployment of the pretensioner.

8. The seat of claim 6, wherein the one or more controllers execute instructions to:
   select the first stage deployment of the pretensioner when a vehicle speed is greater than a first stage deployment speed and less than a second stage deployment speed, where the second stage deployment speed is greater than the first stage deployment speed.

9. The seat of claim 8, wherein the one or more controllers execute instructions to:
   select the second stage deployment of the pretensioner when the vehicle speed is greater than the second stage deployment speed.

10. The seat of claim 1, wherein the anti-submarining belt is constructed of seat belt webbing.

11. A seat for a vehicle, wherein the seat comprises:
    a frame defining opposing side members that each correspond to either a left-hand side or a right-hand side of the seat;
    an anti-submarining belt defining a first end portion, a second end portion, a stowed position, and a deployed position, wherein the first end portion of the anti-submarining belt is fixedly attached to one of the opposing side members the frame, and wherein the anti-submarining belt includes slack when in the stowed position and is pulled taut into the deployed position;
    a seat cushion defining a compressed state and an uncompressed state, wherein the seat cushion rests against anti-submarining belt and is in the uncompressed state when the anti-submarining belt is in the stowed position and is compressed into the compressed state by the anti-submarining belt as the anti-submarining belt is pulled taut into the deployed position;
    a pretensioner connected to the second end portion of the anti-submarining belt, wherein the anti-submarining belt is pulled taut from the stowed position into the deployed position when the pretensioner is deployed, and wherein the pretensioner includes more than one level of deployment; and
    one or more controllers in electronic communication with the pretensioner, wherein the one or more controllers execute instructions to:
    determine the vehicle is about to undergo a collision;
    in response to determining the vehicle is about to undergo a collision, determine a level of deployment of the pretensioner based on a weight of an occupant and a predetermined stiffness of a body of the seat cushion, wherein the deployment compresses the body of the seat cushion no more than twenty millimeters in the compressed state when the occupant is a fiftieth percentile male; and
    send a firing signal to the pretensioner instructing the pretensioner to deploy, wherein the firing signal indicates the level of deployment of the pretensioner.

12. The seat of claim 11, wherein increasing the level of deployment of the pretensioner results in increasing a level of tension the anti-submarining belt undergoes in the deployed position.

13. The seat of claim 11, wherein the one or more controllers determine the level of deployment of the pretensioner further based on an impact severity.

14. The seat of claim 13, wherein the one or more controllers execute instructions to:
    select either a first stage deployment or a second stage deployment of the pretensioner.

15. The seat of claim 14, wherein the one or more controllers execute instructions to:
select the first stage deployment of the pretensioner when a vehicle speed is greater than a first stage deployment speed and less than a second stage deployment speed, where the second stage deployment speed is greater than the first stage deployment speed.

16. A seat for a vehicle, wherein the seat comprises:
a frame defining opposing side members that each correspond to either a left-hand side or a right-hand side of the seat;
an anti-submarining belt defining a first end portion, a second end portion, a stowed position, and a deployed position, wherein the first end portion of the anti-submarining belt is fixedly attached to one of the opposing side members the frame, and wherein the anti-submarining belt includes slack when in the stowed position and is pulled taut into the deployed position;
a seat cushion defining a compressed state and an uncompressed state, wherein the seat cushion rests against anti-submarining belt and is in the uncompressed state when the anti-submarining belt is in the stowed position and is compressed into the compressed state by the anti-submarining belt as the anti-submarining belt is pulled taut into the deployed position;
a pretensioner connected to the second end portion of the anti-submarining belt, wherein the anti-submarining belt is pulled taut from the stowed position into the deployed position when the pretensioner is deployed, and wherein the pretensioner includes more than one level of deployment, and wherein the pretensioner includes more than one level of deployment; and
one or more controllers in electronic communication with the pretensioner, wherein the one or more controllers execute instructions to:
determine the vehicle is about to undergo a collision;
in response to determining the vehicle is about to undergo a collision, determine a level of deployment of the pretensioner based on a weight of an occupant and a predetermined stiffness of a body of the seat cushion, wherein the deployment compresses the body of the seat cushion no more than twenty millimeters in the compressed state when the occupant is a fiftieth percentile male;
send a firing signal to the pretensioner instructing the pretensioner to deploy, wherein the firing signal indicates a level of deployment of the pretensioner; and
select either a first stage deployment or a second stage deployment of the pretensioner.

* * * * *